United States Patent [19]

Curl

[11] 4,121,667
[45] Oct. 24, 1978

[54] POTATO HARVESTER

[76] Inventor: Robert B. Curl, 1960 Floral Ave., P.O. Box 562, Twin Falls, Id. 83301

[21] Appl. No.: 729,394

[22] Filed: Oct. 4, 1976

[51] Int. Cl.² .................... A01D 13/00; A01D 17/04; A01D 33/14
[52] U.S. Cl. .................................. 171/110; 171/112
[58] Field of Search .................. 171/26, 86, 89, 82, 171/83, 110, 112, 104, 136, 141

[56] References Cited

U.S. PATENT DOCUMENTS

| | | | |
|---|---|---|---|
| 969,690 | 9/1910 | Headland | 171/136 |
| 1,478,952 | 12/1923 | Hanks | 171/110 |
| 2,369,723 | 2/1945 | Denlinger | 171/141 |
| 2,532,169 | 11/1950 | Jones | 171/141 |

*Primary Examiner*—Louis G. Mancene
*Assistant Examiner*—Robert P. Swiatek
*Attorney, Agent, or Firm*—Trask & Britt

[57] ABSTRACT

A potato or other root crop harvester having a shock absorbing primary bed is disclosed. The primary bed is held in normal digging position by high pressure fluid cylinders. A shock to the shovels attached to the forward edge of the primary bed causes the fluid pressure to rise within the cylinders, thereby exceeding a relief valve setting and allowing the fluid to discharge from the cylinders to permit the primary bed to move rearwardly, absorbing the shock and preventing damage to the harvester. A further unique feature of the potato harvester is the presence of three shovels attached to the primary bed to harvest three rows simultaneously. The primary bed discharges tubers onto a secondary bed which transports them to lateral transport means to discharge them into trucks or other carriers. A devining chain encompasses the secondary bed, allowing potatoes to fall through onto the secondary bed while carrying vines to the rear of the harvester to discharge them.

10 Claims, 8 Drawing Figures

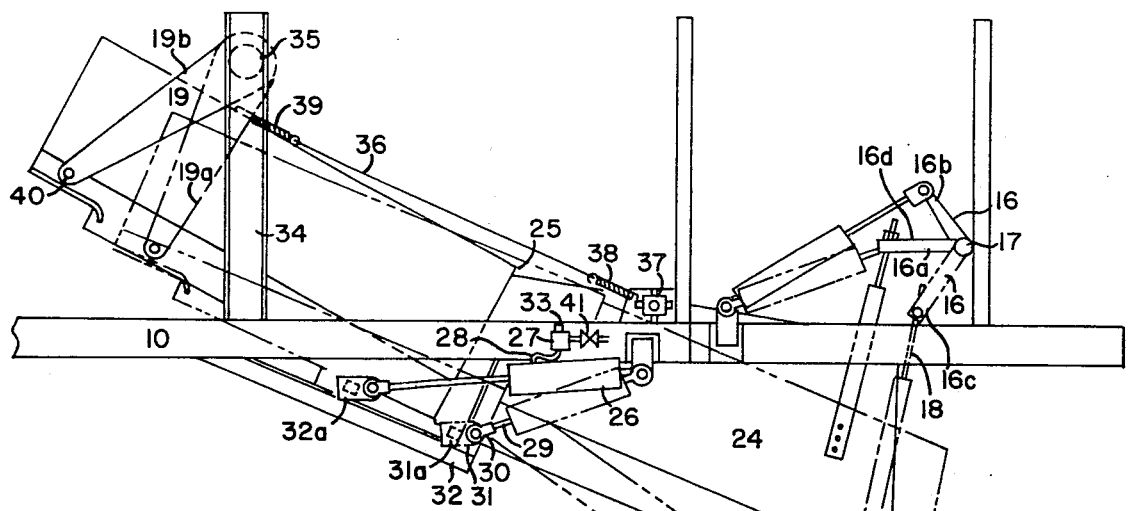
Fig. 2
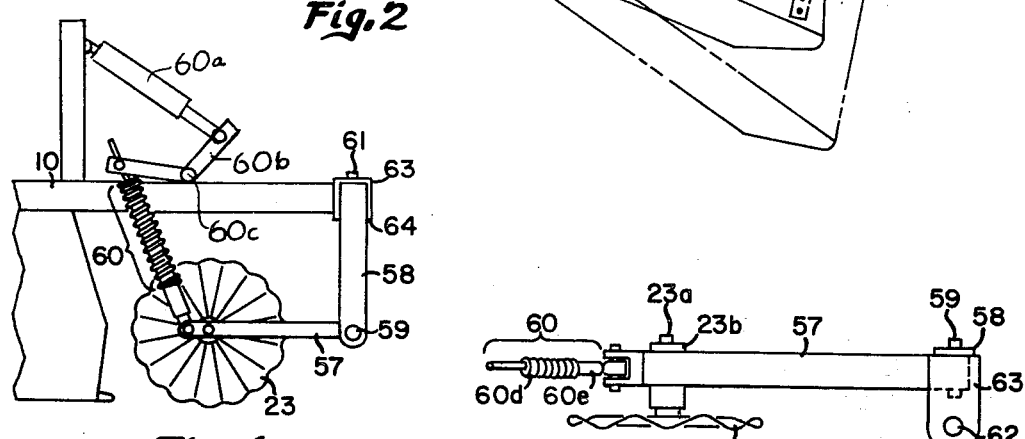
Fig. 4
Fig. 5
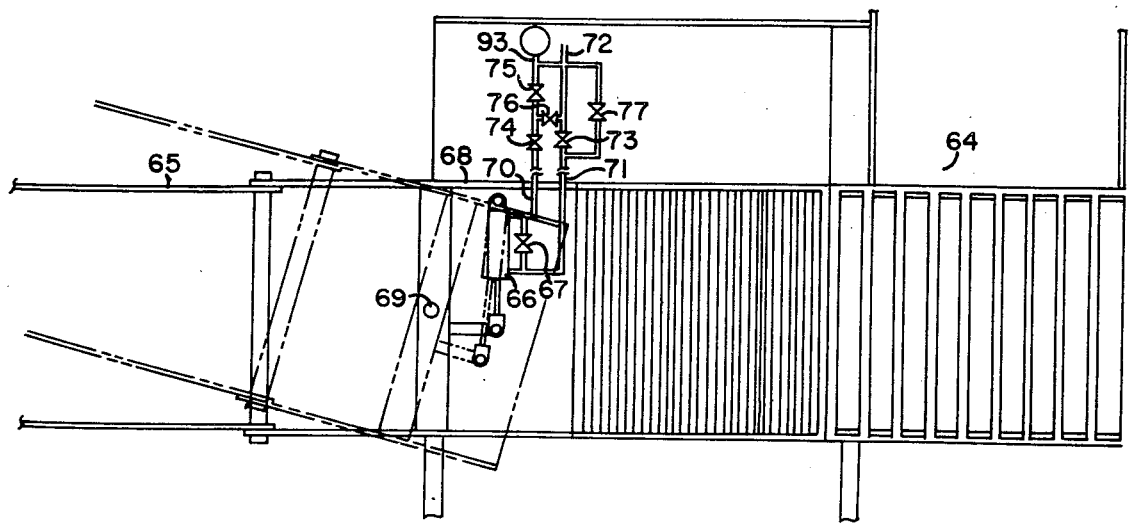
Fig. 6

POTATO HARVESTER

BACKGROUND OF INVENTION

1. Field

The instant invention relates to root crop harvesters, particularly potato harvesters, having primary and secondary beds for transporting dug potatoes away from the ground and wherein the shovel means are attached to the primary bed. The striking of large stones by the shovels frequently causes damage to typical harvesters.

Root crops such as beets, carrots, turnips, onions and the like are frequently harvested with harvesters similar to those used for harvesting potatoes.

2. Prior Art

Potato harvesters heretofore utilized were generally two row harvesters having a primary bed with a pair of shovels attached to the leading edge of the primary bed. The shovels and forward section of the primary bed could be lifted from the ground to facilitate turning of the harvester and transport. The primary bed was separated from the secondary bed to minimize maintenance problems associated with long conveyor chains and to allow the secondary bed to operate even if one primary conveyor failed.

Typical harvesters have a cross-conveyor to receive potatoes from the secondary bed conveyor. The potatoes are then transported to a picking table by a side elevator, then to a boom conveyor which may be swung into a fixed lateral position to the harvester to discharge the potatoes into trucks. The lateral boom is occasionally damaged by being struck with a truck.

The shovels are frequently straddled by flat disks, often known as coulter wheels, which cut vines and the earth on either side of a row of tubers to assist the shovel in dislodging and uprooting the tubers with a minimum of damage to the tubers. These disks are occasionally damaged when striking a stone.

Potatoes and small stones, unearthed by the shovels, pass over the shovels and onto the primary bed conveyor. Occasionally a stone becomes lodged between the rear edge of the shovel and the primary conveyor, causing the harvester to halt or causing damage to the primary conveyor.

A typical potato harvester widely utilized in harvesting tuber crops is described in U.S. Pat. No. 23,827 of Peterson. This device has an elongated primary bed which conveys the potatoes to a lateral conveyor.

OBJECTS OF THE INVENTION

It is an object of the instant invention to provide a tuber harvester having means to prevent rock damage to the shovels thereof;

It is a further object of the invention to provide a soil cutting wheel which is not easily damaged by rocks and the like;

A further object of the invention is to provide a tuber harvester capable of simultaneously digging three evenly spaced rows;

Another object of the instant invention is to provide a tuber harvester wherein the primary conveyors are not easily jammed by rocks and other solid debris;

A further object of the instant invention is to provide a tuber harvester having a side arm conveyor which is not easily damaged by forces lateral thereto.

DESCRIPTION OF DRAWINGS

FIG. 2 is an elevational side view of a shock absorbing primary bed;

FIG. 4 is an elevational side view of a pivoted coulter mount;

FIG. 5 is a plan view of a crinkled coulter wheel and pivoted coulter mount;

FIG. 6 is a plan view of a shock absorbing discharge conveyor;

DESCRIPTION OF INVENTION

Figure 1:
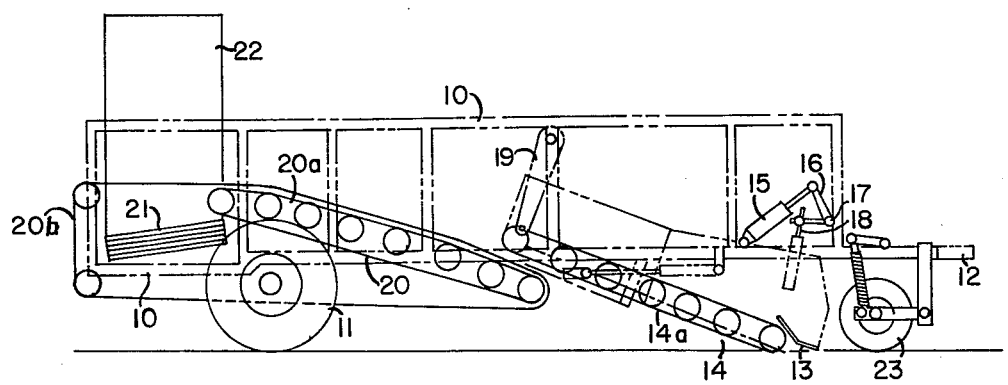
FIG. 1 is an elevational side view of a harvester having a primary and secondary bed.

The instant invention pertains to a unique tuber harvester having a primary bed and secondary bed wherein said primary bed has shovels attached to the leading edge thereof and has means to absorb shock and prevent damage to the shovels and to the harvester generally. The invention further pertains to a novel three-row harvester having equidistantly spaced shovels.

The potato harvester has a primary bed and a secondary bed with shovels for unearthing potatoes attached to the leading edge of the primary bed. The primary bed can be elevated at the leading edge so as to elevate the shovels so that the harvester can be turned and trailed without the shovels contacting the ground. As hereinbefore indicated, the striking of a large rock by one of the shovels can cause severe damage to the shovel and oftentimes to the harvester itself. In Idaho the rocks often are sub-surface peaks of lava many yards thick and continuous. The instant invention provides a primary bed which is equipped with shock absorbing means so that upon the striking a rock by one of the shovels, the primary bed shifts to the rear a sufficient distance to absorb the shock and prevent damage to the shovel and to the harvester.

The shock absorbing means of the instant invention preferably comprises means which apply a certain constant force to the shovels and wherein the striking of an object results in an excess opposite force to be applied to the shovels, the force applied to primary beds is released so that it may shift to the rear. Preferred means of applying force to the shovels is through a pair of hydraulic cylinders, with a safety valve having a predetermined pressure release to allow escape of fluid from the cylinders, thereby allowing the primary bed to move to the rear. Alternative techniques involve the use of a pneumatic system or a pawl and gear wherein the gear is held to a fixed shaft by shear pin having a predetermined shearing stress which is sufficiently low to allow the shear pin to shear upon the shovel striking a large object such as a rock, without harm being done to the shovels or the harvester. The shock absorbing means may be interconnected with the lift means so that when the primary bed is forced to the rear, the lift means is activated so that the shovels are removed from the ground.

The shock absorbing feature of the primary bed is especially well suited for the novel three-row harvesters described herein. The evolution of farming toward larger operations and the farming of more marginal agricultural land has resulted in a concomitant evolution of farming equipment. Planters have evolved from conventional two-row planters to four, six and eight-row planters. Potato harvesters have typically been two-row harvesters since the spacing for a selected two rows were uniform since multiple planters in use had a number of planting tubes which were multiple of two. Potato harvesting and planting equipment are also exposed to rougher use on marginally productive land.

The three-row harvester described herein, however, has significant advantages inasmuch as six-row planters are in wide spread use today. Thus, there are groupings of three rows having constant spacing susceptible of being harvested by a three row harvester. The three-row harvester has a significant advantage inasmuch as it is fifty percent faster than a comparable two-row harvester and the trucks can be filled much faster with a three-row harvester, thus achieving a significant savings in time and labor.

The harvesters of this invention preferably have a primary bed conveyor associated with each shovel. Narrower conveyors are less likely to be damaged by stones, etc. and are more easily changed than conveyors two or three rows wide.

The invention may be more fully understood by reference to the attached drawings wherein FIG. 1 is an elevational side view of a tuber harvester. The harvester is supported by a frame 10 and at least one pair of support wheels 11. The support wheels are preferably to the rear of the center of gravity of tractor pulled harvesters. The forward portion of the harvester is attached to the tractor through a tongue or hitch 12. Plows or shovels 13 are attached to a primary bed 14 having thereon conveyor means 14a. The forward part of the primary bed is connected by lift means to a high pressure fluid cylinder 15 through lever 16 pivoted about a pin 17 wherein the extension of the piston rotates lever 16 and raises arm 18 which supports the forward portion of the primary bed. The rear portion of the primary bed is hinged above arm 19 and pivots about arm 19 to retract slightly upon striking of an object.

The primary conveyor bed 14 discharges harvested tubers upon a secondary bed 20 comprising a devining chain through which the potatoes fall upon conveyor means 20a which discharge potatoes onto a lateral conveyor 21 transporting to elevator means 22 to be discharged into trucks or other carriers. The devining chain 20b carries the vines to the rear of the harvester to be discarded there. The harvester is pulled through a field with the shovels in a lowered or digging position with a coulter wheel 23 slicing along the row immediately to the side of the outer most plows to facilitate the unearthing of the tuber crop.

An elevational view of the primary bed and the shock absorbing and lift mechanism is illustrated in FIG. 2. The primary bed 24 is shown in an elevated position in the solid lines and in a lowered or digging position in the phantom lines. Upon striking a solid object by one of the shovels, the whole primary bed moves rearwardly. However, only the lower section of the primary bed is lifted, as illustrated in FIG. 2. The primary bed is hinged near its midsection 25 to form a lateral joint to permit lifting of only the lower section.

The lift mechanism may be operated automatically as a part of the shock absorbing system or it may be manually controlled by the operator of the self-contained harvester or by the operator of the tractor pulling a drawn harvester wherein the operator activates a valve to allow high pressure fluid to flow into cylinder 15 thereby extending its piston forward, causing arm or lever 16 to move from position 16a to position 16b causing a lower part of the arm to pivot about pin 17 and to move from position 16c to position 16d thereby lifting the forward portion of the primary bed from a digging position to an elevated position through the connection of arm 18 to the forward portion of the primary bed. (The angular shape of arm 16, pinned by pin 17 near its midsection, causes the lift position 16d of the lower portion of arm 16 to hide the digging position 16a of the upper portion of arm 16.)

The lift mechanism also operates automatically in conjunction with the shock absorbing mechanism. With the primary bed in a digging position, the striking of a large solid object by one of the plows transmits the force to the shock absorbing cylinder 26 (which is shown in the phantom lines in a digging position) with sufficient force to increase the fluid pressure therein above the pressure level of relief valve 27 attached to the exterior of the frame for convenience of illustration inasmuch as it may be attached to any solid portion of the frame in close conjunction with cylinder 26 and connected with a flexible high pressure hose 28 to the cylinder 26.

The piston arm 29 is attached through a clevis 30 to a lug 31 which is anchored to the bottom of the primary bed with a drive which rests upon rails 32 so that the lug may move from position 31a to position 32a through the force of the primary bed striking a solid object. As the fluid is forced to discharge from cylinder 26, it passes through relief valve 27 and through tubing 33 to a high pressure fluid reservoir, either on the harvester or upon the tractor pulling the harvester.

A stanchion 34 is attached to frame 10 to support pivot arm 19 which is shown in a digging position 19a and a retracted position 19b. The digging arms are preferably of heavy, sturdy material as is the axle 35 about which pivot arm 19 rotates. There is a pivot arm on each side of the primary bed, preferably both rotating about axle 35. The sturdiness of the pivot arms keeps the bed from becoming twisted or canted when an outside shovel strikes a buried object.

Pivot arm 19 is connected through a tension loaded line 36 to a hydraulic valve 37. The tension of line 36 may be supplied by a pair of coil springs 38 and 39. As the pivot arm swings to the rear because the primary bed has struck an immovable object, the movement of line 36 opens valve 37 to allow high pressure fluid to flow into cylinder 15 which causes the forward portion of the bed to lift. Pivot arm 19 is attached to the primary bed along its base and rear portion by pin 40.

To return the primary bed to a digging position the operator of the harvester opens valve 41 to allow the high pressure fluid to return to cylinder 26 and retract the piston and cause the primary bed to move forward. At the same time valve 41 is actuated it causes the high pressure fluid to flow from cylinder 15. Cylinder 15 may be a single acting cylinder or a double acting cylinder. If it is a single acting cylinder, the release of the high pressure fluid from the cylinder to return it to the fluid reservoir allows the primary bed to drop to the digging position through the weight of the primary bed. When a double acting cylinder is used, which is preferred, then fluid is introduced into the forward portion of the cylinder at the same time the high pressure fluid is released in the rear of the cylinder to drive the piston towards the rear of the cylinder and then cause arm 16 to return to position 16a and force the primary bed to a lowered position. Thus, through the pressurizing of cylinder 26 and the release of high pressure fluid from cylinder 15, the primary bed is returned to its lowered, forward, digging position.

The striking of the shovels of the primary bed against an immovable, buried object will cause a shock to the harvester and tractor of sufficient magnitude that the tractor operator will immediately know that an object has been struck, however, an alarm can be connected electrically through switch attached to piston arm 29 and cylinder 26 so that it trips an electrical switch to activate either a light or alarm on the tractor so that the operator is informed that the primary bed has retracted and so that he can stop the tractor immediately and then return the primary bed to its lowered digging position.

Figure 3:
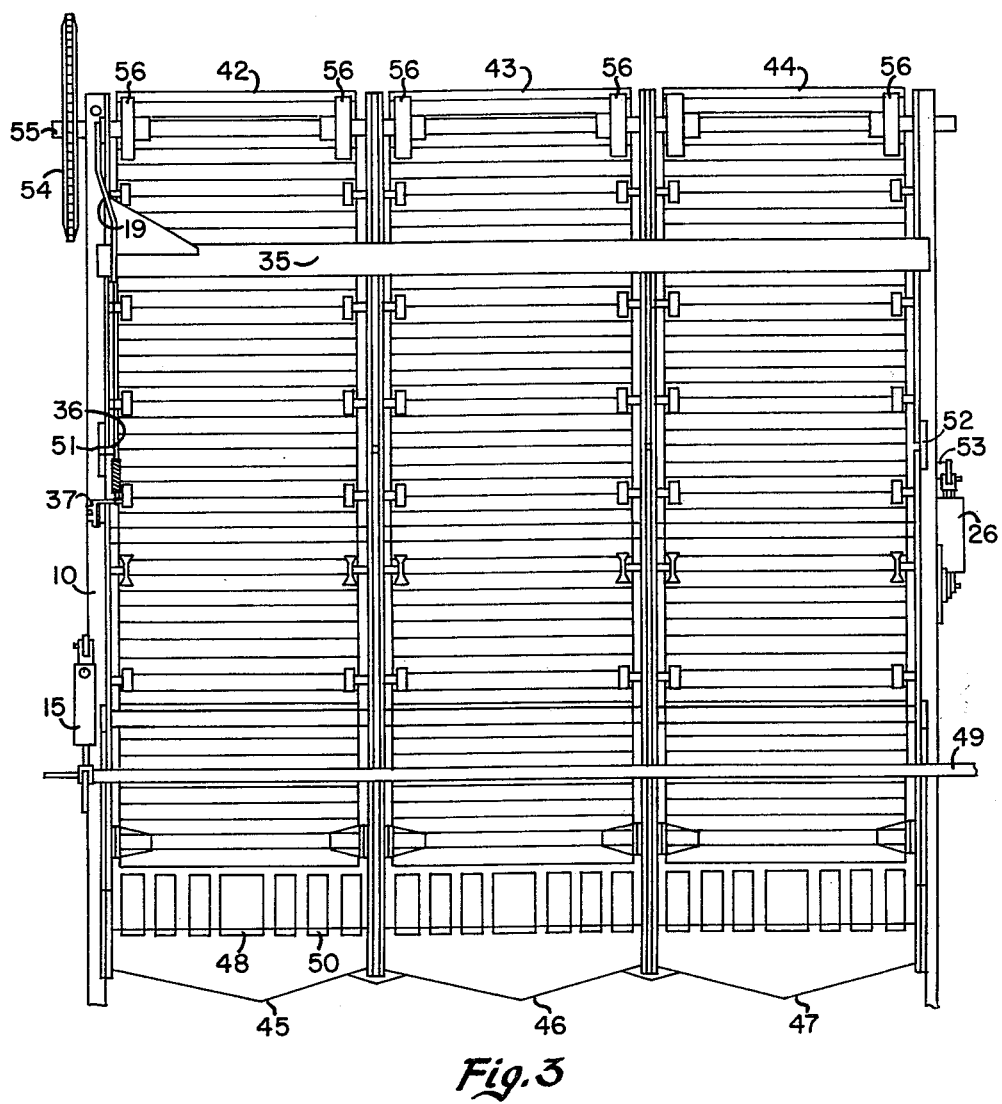
FIG. 3 is a plan view of a three row primary bed having shock absorbing means.

A plan view of the primary bed is illustrated in FIG. 3 wherein three conveyors 42, 43 and 44 are illustrated as communicating directly with shovels 45, 46 and 47. The shovels or digger blades 45, 46 and 47 each have numerous strips or straps of metal or durable plastic 48, 50 which extend from the rear edge of the shovel towards each conveyor 42, 43 and 44. These flaps may slightly overlap the upper portion of the conveyor and tend to prevent stones, tuber crop and debris from becoming clogged between the conveyor chain and the rear portion of the shovel.

The position of cylinder 15 to lift the forward portion of the primary bed can be viewed in FIG. 3. Pin 49 is shown extending the width of the primary bed to act as a pivot point for the lift levers on each side of the primary bed.

The hinging of the forward portion of the primary bed to the rear portion is illustrated in FIG. 3 by hinges 51 and 52. A slide bar extends from beneath the primary bed to connect to shock absorbing cylinders 26. The tension line 36 (FIG. 2) interconnects between pivot arm 19 and hydraulic control valve 37 as viewable in FIG. 3. Pin 35 is shown connecting to the primary bed. A drive pulley 54 is illustrated which is attached to a shaft 55 which drives the rear sprockets 56 to drive all three conveyors of the primary bed.

A crinkled type coulter wheel and its assembly is illustrated in detail in FIGS. 4 and 5. The coulter wheel 23 of FIG. 1 is illustrated in FIG. 4 as a crinkled wheel, that is, a wheel in which the outer edge is dished laterally in one direction and then dished laterally in the other direction. This assists in moving the wheel around small rocks and the like since the whole assembly is pivoted and the crinkling effect increases the likelihood that the coulter wheel will strike a rock a glancing blow and can thus be diverted around the rock rather than to travel directly over a small rock as is the case with a flat, uncrinkled coulter wheel. Also, a crinkled wheel tends to keep turning so that it more effectively cuts the vines alongside the plow members.

The coulter wheel 23 is attached by an axle to an arm member 57 which is pivoted to the upright member 58 through pin 59. This permits the coulter wheel to move in a vertical direction and thus slide over any large obstacles which it is not deflected around. The coulter wheel is further attached to the frame member 10 by a fluid cylinder 60a and coil spring shock absorbing member which provides a certain downward force on the coulter wheel to keep it in the ground while the crop is being harvested, but yet is sufficiently resilient to allow the coulter wheel to move upwards upon striking an immovable object. The shock absorbing member 60 may be a combination of a fluid type shock absorber having an orifice on the interior wherein the fluid within the cylinder is permitted to flow from one portion of the cylinder to another whenever a force is applied to a piston therein having an orifice therein.

The cylinder 60a acts through arm 60b which is pivoted about pin 60c to elevate and lower the coulter wheel. The upright member 58 is pivoted through a pin 61 to frame 10 so that arm 58 is slightly offset from the pin 61, as illustrated in FIG. 5 wherein the opening 62 receives pin 61 to attach the coulter wheel assembly to the frame.

The plan view of FIG. 5 illustrates the clevis having an upper plate 63 and a lower plate 64 and an opening 62 in register in each plate to accept pin 61 which passes through the clevis and through frame member 10 to secure stanchion 58 to the frame 10. In FIG. 5 arm 57 is shown pivoted about pin 59 which passes through stanchion 58. Thus, the crinkled coulter wheel possess limited movement ability in a vertical as well as in a lateral direction. The coulter wheel is attached to axle 23a which passes through bearing 23b which passes through or is affixed to arm 57. The shock absorbing assembly 60 comprises a coil spring 60a and a fluid filled cylinder 60e which has a piston with an orifice therein.

A shock absorbing boom or discharge chute is illustrated in FIG. 6 which is a plan view of the lateral conveyor 64 and of the discharge chute 65 which is shown in the solid lines of the direction perpendicular to the main body of the harvester and in phantom lines at an acute angle to the harvester. A double acting hydraulic cylinder 66 controls the lateral position of the discharge chute and in connection with release valve 67 provides shock absorbing means whereby the discharge chute can swing freely if struck by a truck or other object which has a different relative speed than the harvester. The lateral conveyor 64, which may be an elevator, overlaps the base section 68 of the discharge chute so that the lateral conveyor 64 discharges its crop onto the chute conveyor regardless of the angle which the chute conveyor has in relation to the main body of the harvester. The chute conveyor pivots about pin 69 while the lateral conveyor terminates at about that location.

The double acting hydraulic cylinder is fed by hydraulic lines 70 and 71 which may be controlled from the harvester or from a tractor pulling the harvester. The driver of the tractor or of a self-contained harvester can control the exact position of the chute with relation to the harvester by high pressure fluid, as available from line 72 while line 93 returns fluid to a fluid reservoir. A valve system such as that shown in FIG. 6 can be utilized to switch the high pressure fluid into either end of cylinder 66 so that the direction of travel and stationary position of chute 65 can be controlled by the operator of the tractor or harvester. High pressure fluid can flow into the free end of cylinder 66 by opening valve 73 and valves 74 and 75 while valves 76 and 77 remain closed. High pressure fluid can be charged to the anchored end of cylinder 66 by closing valve 73 and opening valves 76 and 74 and 77 while valves 75 and 73 remain closed. With valves 73 and 74 closed the chute remains stationary in whatever position it has been placed. However, relief valve 67 still permits the double acting cylinder 66 to act as a shock absorber inasmuch as any blow struck to the chute will cause the relief valve to open and allow fluid to flow from one end of cylinder 66 to the other end.

Thus, the operator of the tractor or harvester may position the chute in substantially any angular position to the harvester and may slowly swing the chute in relation to the harvester so that the truck or other load carrying device which is receiving the crop can be positioned directly along the harvester and the driver of the truck may drive at a constant speed and maintain a specific position along side the harvester, yet the boom or chute may gradually swing to distribute the load better within the truck.

Figure 7:
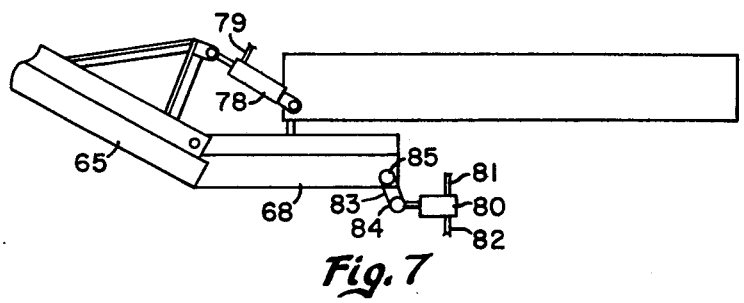
FIG. 7 is an elevational view of a shock absorbing pivoted discharge chute.

The elevational position of the boom 65 is controlled through a hydraulic cylinder 78 while allowing hydraulic fluid to be released to line 79 which permits the boom to be lowered. Also, in FIG. 7 the drive of the boom conveyor is shown being driven by a hydraulic motor 80 which is driven by a hydraulic fluid entering line 81 and discharging line 82 to drive a pinion gear arrangement 84. Gear 84 is connected by a chain 83 to gear 85 which drives the boom conveyor.

Figure 8:
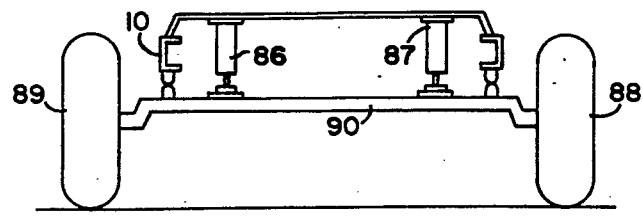
FIG. 8 is a perspective view of a hydraulically supported harvester axle.

In FIG. 8 system is disclosed wherein hydraulic cylinders 86 and 87 are connected between the frame of the harvester and the load bearing axle of the harvester so that either cylinder may be activated to force wheels 88 and 89 respectively, in a downward direction. Since the harvester is generally riding with one load bearing wheel on solid ground and the other load bearing wheel on newly plowed ground, the load bearing wheel on the newly plowed ground tends to sink, thus causing the diggers to dig at different depths. The hydraulic cylinders 86 and 87 are independently activated and whichever wheel is riding on the loose, newly plowed soil may be lowered in relation to the frame of the harvester by activation of the hydraulic cylinder closest to that wheel. Thus, activation of cylinder 86 raises frame 10 from the axle 90 so that in the event wheel 89 is riding in loose soil the main body of the harvester may be maintained in a substantially parallel condition to the surface of the soil being plowed.

The shock absorbing bed principle may be applied to stone and rock removing apparatus whereby small and moderately large rocks are removed from a field. The structure of such rock removers is essentially the same as the harvester illustrated herein, especially the plows and primary bed structure. The addition of a shock absorbing primary bed to a rock remover prevents damage to the rock remover upon its striking an unmovable rock.

I claim:

1. A multirow root crop harvester having shovel means for unearthing the root crop and having a plurality of conveyors to convey said root crop to hauling means comprising:
    (a) a primary bed having conveyor means thereon with said shovels attached thereto;
    (b) a secondary bed having one end contiguous to and slightly below the upper end of said primary bed;
    (c) lift means attached to the shovel end of said primary bed adapted to lift said shovels above ground level;
    (d) shock absorbing shift means attached to said primary bed adapted to release the primary bed, to allow said primary bed to shift rearward upon the shovels striking a rigid object and to activate automatic lift means to lift said shovels from ground level.

2. The harvester of claim 1 wherein said shock absorbing means comprises a fluid filled cylinder hydraulically connected to a relief valve set at a predetermined pressure, said cylinder fixed through its piston to mechanical means for holding said shovels in a digging position.

3. The harvester of claim 1 wherein said shock absorbing means comprises a shear pin set to fail at a predetermined stress, said shear pin fixed to mechanical means for holding said shovels in a digging position.

4. The harvester of claim 1 wherein said primary bed is suspended at its upper end by a pair of swing arms adapted to allow the primary bed to shift rearward upon the shock absorbing means exceeding its predetermined setting.

5. The harvester of claim 1 wherein sad primary bed has a separate conveyor associated with each shovel.

6. The harvester of claim 1 wherein said primary bed has mid-section hinge means to form a rear portion and a forward portion, said forward portion being attached to said lift means.

7. The harvester of claim 2 wherein said shock absorbing means comprises a pair of interconnected shock absorbing cylinders, said cylinders located on opposite sides of the harvester.

8. The harvester of claim 4 wherein said swing arms are attached to a single axle supported at opposite ends by heavy duty support means of sufficient strength to prevent said primary bed from becoming canted upon striking of a rock by an outside plow.

9. The harvester of claim 2 wherein said fluid filled cylinders are double acting cylinders.

10. The harvester of claim 1 wherein said lift means comprises a hydraulic cylinder interconnected through its piston to mechanical means for lifting and lowering said shovels.

* * * * *